Patented June 1, 1926.

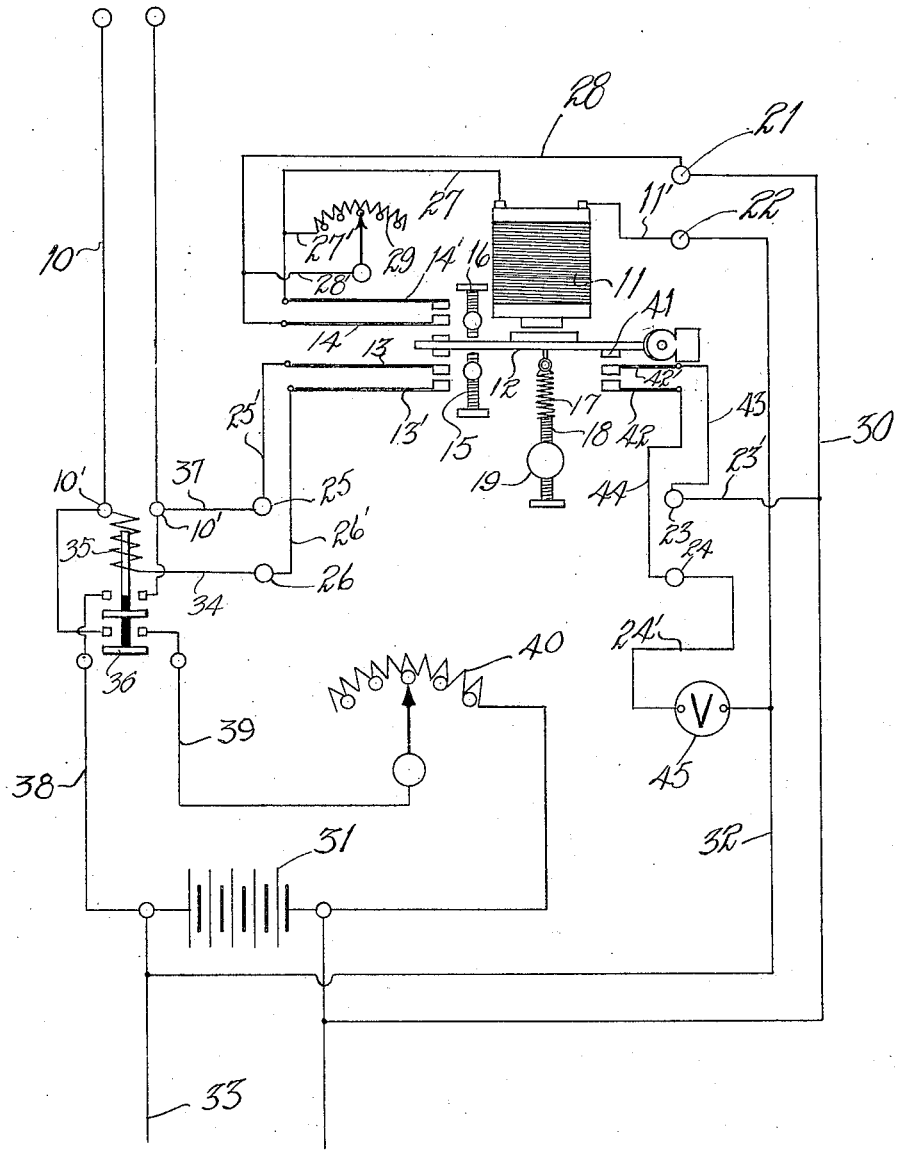

1,587,061

UNITED STATES PATENT OFFICE.

CHARLES R. ANDERSON, OF DALLAS, TEXAS.

AUTOMATIC ELECTRIC CONTROLLING DEVICE.

Application filed August 28, 1922. Serial No. 584,916.

This invention relates to new and useful improvements in automatic electric controlling devices for charging storage batteries.

The object of the invention is to provide automatic means for controlling the charging of storage batteries and for maintaining a substantially fixed voltage. Another object is to provide a device which may either be used as a controlling means in the recharging of batteries or as an automatic starting and stopping device for the charging circuit of farm lighting plants and the like.

A further object is to provide a device which will be very sensitive and capable of a wide range of adjustment.

A construction designed to carry out the invention will be hereinafter described together with other features of the invention.

The invention will be more readily understood from a reading of the following specification and by reference to the accompanying drawings, in which an example of the invention is shown and wherein:

The figure is a diagrammatical view of a device arranged in accordance with the invention.

In the drawings the numeral 10 designates a main charging circuit. I provide a relay which comprises an electro-magnet 11, an armature 12 having contacts on each side thereof, spring contacts 13 and 13' disposed on one side of the armature and spring contacts 14 and 14' disposed on the opposite side of the armature, said contacts being normally spaced apart and spaced from the armature. A stop screw 15 is arranged on one side of the armature while a similar stop screw 16 is mounted on the other side. A tension spring 17 is connected to the armature in opposition to the magnet 11 and is fastened to an adjusting screw 18 mounted in a post 19. The relay is mounted on a panel board not shown which has terminals 21, 22, 23, 24, 25 and 26, respectively. The magnet 11 is connected with the terminal 22 by a wire 11'. A circuit wire 27 extends from the opposite pole of said magnet and is connected with the spring contact 14'. A circuit wire 28 extends from the contact arm 14 to the terminal 21. A controlling rheostat 29 is bridged over the circuit wires 27 and 28 by means of wires 27' and 28', respectively.

A circuit wire 30 of a battery voltage circuit is connected with one of the terminals of a battery 31 and extends from the terminal 21, while a second circuit wire 32 extends from the terminal 22 to the other terminal of said battery. A working circuit 33 leads from the battery 31. It is to be understood that one or more batteries may be connected, but only one battery 31 is illustrated. It will be seen that the electro-magnet 11 is connected in the battery voltage circuit.

A secondary battery charging circuit is made up as follows. A wire 25' leads from the contact arm 13 to the terminal 25 while a circuit wire 26' leads from the arm 13' to the terminal 26. A circuit wire 34 extends from the terminal 26 to one side of the main circuit 10. The electro-magnet 35 of a circuit breaker 36 is connected in said wire. Another circuit wire 37 leads from the terminal 25 to the other side of the main circuit 10. The main circuit 10 has connection with contact posts 10' and the circuit breaker 36 is adapted to engage said posts when the magnet 35 is energized. A circuit wire 38 leads from one terminal of the circuit breaker to the battery 31, while a circuit wire 39 leads from the other terminal of the circuit breaker to the other terminal of the battery. A charging rheostat 40 is connected in the circuit 39 and controls the voltage delivered to the battery.

The armature 12 is provided with a contact 41 on the opposite side to the magnet 11. Normally spaced spring arm contacts 42, and 42' are disposed in the path of the contact 41. A wire 43 leads from the binding post 23 to the arm 42' while a wire 44 leads from the arm 42 to the terminal 24. A wire 23' extending from the terminal 23 is connected with the wire 30 of the battery circuit and a wire 24' extending from the terminal 24 is connected with wire 32. A voltmeter or other recording or indicating device 45 is connected in the wire 24'.

The operation of the device is as follows:

When the circuit breaker 36 is open no current can pass over the wires 38 and 39 to the battery. Current from the battery passes over the wire 32 and the wire 11' to the magnet 11, then over the wires 27 and 27' to the rheostat 29. The current after passing thru the rheostat is returned over the wires 28', 28 and 30 to the battery. When the electro-magnet 11 is energized the armature 12 is attracted against the tension of the spring 17 and when the spring arms 14 and 14' are engaged their contacts are brought together, whereby the rheostat 29 is shunted out of the circuit. It will be understood that with a fully charged battery, connected in the circuit, this will be the condition of the apparatus.

When the voltage of the battery 31 drops below a certain pre-determined pressure the spring 17 will overcome the electromotive force and swing the armature 12 in the opposite direction, whereby it engages the spring arms 13 and 13'; being arrested in its movement by the stop screw 15. The contacts of the arms 13 and 13' being engaged close the circuit over the wires 37, 27', 26' and 34, whereby the magnet 35 is energized and the circuit breaker contacts 10' are caused engaged. This causes the current from the main charging circuit 10 to pass over the wire 38 to the battery 31 and then over the wire 39 in which the rheostat 40 is connected. The rheostat is set so that the battery will receive the proper charging current.
When the armature arm 12 is swung toward the stop screw 15 the contact 41 engages the spring arms 42 and 42', whereby their contacts are engaged and a circuit is closed from the wire 32 over the wire 24', wire 44, wire 43 and wire 23 to the wire 30. This energizes the recording device 45. It will be seen that by regulating the screw 18 the tension of the spring 17 is controlled so that a stronger or weaker electromotive force may be developed in the magnet 11. In this way the exact voltage required to operate said magnet may be determined and thus definite points established at which the charging circuit will be cut in and out automatically.

The rheostat 29 is adjusted in harmony with the voltage regulation and may be used in connection with the spring 17 to regulate the operation of the device.
When the battery has been charged to the point that its voltage is sufficient to overcome the resistance of the rheostat 29 and to create sufficient eletromotive force in the magnet 11 to overcome the tension of spring 17, the armature 12 will be gradually attracted so as to engage the spring arm 14. When the contact of the spring arm 14 is engaged with the contact of the spring arm 14' the rheostat 29 will be shunted out and the battery circuit closed thru said arms, whereby the armature will be held against the stop screw 16 and in contact with the magnet 11. This condition will remain so long as the voltage of the battery is above the minimum point at which the tension of the spring 17 will overcome the electromotive force. When the armature 12 is swung toward the magnet the contact between the arms 13 and 13' will be broken and thus the circuit thru the circuit breaker 36 will be opened, the latter automatically disengaging from the contacts 10'. This will interrupt the charging circuit to the battery and will also break the circuit to the recording device 45.

It will be seen that suitable means may be arranged for closing a circuit to a starter switch, or other mechanism, for generating a current, when the armature is swung toward the magnet 11.

What I claim is:

1. In an automatic battery charging system, a main charging circuit, an electromagnet connected across the battery in series with a resistance regulating the cut-off point on charge, an armature for said electromagnet having contacts to short-circuit the resistance during discharge, a circuit maker between said main charging circuit and the battery, and a circuit adapted to close said circuit maker by energization of a coil therein, said closing circuit being itself established by contacts on said armature when the battery is discharged.

2. In an automatic storage battery charging controlling system, a main charging circuit, a battery voltage controlled circuit including variable resistance, a secondary circuit connected with the main charging circuit and including a normally open circuit breaker adapted to establish connection between the main circuit and the battery when closed, an electromagnet to close said circuit breaker, an electromagnet device disposed in and energized by said battery voltage controlled circuit, a circuit bridged across said main circuit and including said electromagnet and adapted to be closed upon de-energization of said electromagnetic device and thereby to close said circuit breaker, and a circuit in shunt of said variable resistance and adapted to be closed by and upon energization of said electromagnetic device.

3. In an automatic battery charging controlling system, a main charging circuit, a battery voltage controlled circuit including variable resistance, a normally open circuit shunting said resistance, a secondary circuit connected with the main charging circuit and including a normally open circuit breaker adapted to establish connection between the main circuit and the battery when closed, an electromagnetic relay energized by said battery voltage controlled circuit, said relay alternately closing said secondary circuit and said resistance shunting circuit, and means for controlling the cut-off point of said relay.

4. In an automatic battery charging controlling system, a main charging circuit, a battery voltage controlled circuit including variable resistance, a normally open circuit shunting said resistance, a secondary circuit connected with the main charging circuit and including a normally open circuit breaker adapted to establish connection between the main circuit and the battery when closed, an electromagnet to close said circuit breaker, an electromagnetic relay energized by said battery voltage controlled circuit, said relay alternately closing said secondary circuit and said resistance shunting circuit, a spring to bias the armature of the relay, and means to vary the tension of said spring.

5. In an automatic battery charging system, a normally open electromagnetic circuit breaker adapted to connect a battery to a main charging circuit, means for energizing said circuit breaker at a predetermined low-voltage and for de-energizing said circuit breaker at a predetermined high-voltage, said means including an electromagnet supplied with current proportionate to the voltage of the battery through a regulating resistance, a biased armature actuated by said electromagnet, contacts associated with said armature to short-circuit the regulating resistance when closed, and means for varying the high and low voltage cut-off points of said energizing means independently of each other.

In testimony whereof I affix my signature.

CHARLES R. ANDERSON.